(12) United States Patent
Liu (10) Patent No.: US 8,925,399 B2
(45) Date of Patent: Jan. 6, 2015

(54) ELECTRONIC APPARATUS USE ENVIRONMENT DETECTING METHOD, ELECTRONIC APPARATUS PERFORMANCE OPTIMIZING METHOD AND ELECTRONIC APPARATUS

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 459 days.

(21) Appl. No.: 13/396,856

(22) Filed: Feb. 15, 2012

(65) Prior Publication Data
US 2012/0227486 A1    Sep. 13, 2012

(30) Foreign Application Priority Data

Mar. 7, 2011    (CN) .......................... 2011 1 0054426

(51) Int. Cl.
*G06F 3/0346* (2013.01)
*H04M 1/725* (2006.01)

(52) U.S. Cl.
CPC ......... *G06F 3/0346* (2013.01); *H04M 1/72569* (2013.01); *H04M 2250/12* (2013.01)
USPC ...................................................... 73/865.8

(58) Field of Classification Search
None
See application file for complete search history.

(56) References Cited

U.S. PATENT DOCUMENTS

2009/0312049 A1    12/2009  Isomursu

FOREIGN PATENT DOCUMENTS

| EP | 1 686 776 A1 | 8/2006 |
|---|---|---|
| EP | 2 264 988 A1 | 12/2010 |
| JP | 2005 260341 A | 9/2005 |
| WO | 2008/075082 A1 | 6/2008 |

OTHER PUBLICATIONS

International Search Report and Written Opinion, corresponding to PCT/IB2012/000291, date of mailing Jun. 27, 2012.
International Preliminary Report on Patentability, corresponding to PCT/IB2012/000291, mailed Sep. 19, 2013.

*Primary Examiner* — Robert R Raevis
(74) *Attorney, Agent, or Firm* — Renner, Otto, Boisselle & Sklar LLP (57) ABSTRACT

Apparatus and method use a vibrator and an accelerometer of electronic apparatus for detecting the use environment of the electronic apparatus, and according to the use environment a method and electronic apparatus are provided for optimizing the performance of the electronic apparatus according to the use environment of the electronic apparatus. The method for detecting use environment comprises: determining the basic parameters of the electronic apparatus; searching for the acceleration thresholds of the electronic apparatus according to the determined basic parameters of the electronic apparatus; and determining the use environment according to the detected acceleration of the electronic apparatus and the found acceleration thresholds of the electronic apparatus. The use environment of the electronic apparatus may be detected by the vibrator and accelerometer of the electronic apparatus, thereby optimizing the performance of the electronic apparatus according to the use environment.

20 Claims, 4 Drawing Sheets

ELECTRONIC APPARATUS USE ENVIRONMENT DETECTING METHOD, ELECTRONIC APPARATUS PERFORMANCE OPTIMIZING METHOD AND ELECTRONIC APPARATUS

TECHNICAL FIELD

The present invention relates to a vibrator and an accelerometer of electronic apparatus and in particular, to a method for detecting the use environment of electronic apparatus by a vibrator and an accelerometer of the electronic apparatus, a method for optimizing the performance of the electronic apparatus according to the use environment of the electronic apparatus, and electronic apparatus using these methods.

BACKGROUND ART

As the fast development of electronic technologies and communication technologies occurs, electronic apparatus becomes more and more smart, and has more and more functions, with the built-in vibrator and accelerometer being widely used.

A vibrator, also referred to as oscillator, electromotor, or motor, is driven by a fixed signal to produce vibration as an incoming call prompt or a timing alert of an electronic device of a mobile phone etc. Generally, the vibrating speed of a vibrator can reach a maximum of 8300 RPM. In certain cases, such as in a conference, and a class, etc., it is usual to prompt an incoming call or timing expiration by vibrating, so as to avoid disturbing others by the ring of a mobile phone.

An accelerometer measures the acceleration of a mobile phone by detecting the inertia of the mobile phone. An accelerometer may be classified into a linear accelerometer and an angular accelerometer. In a mobile phone, the accelerometer may be used for games, navigation, and screen positioning, etc., enriching the use experiences of the users.

The more functions, the more memory consumption and power consumption are needed. When a mobile phone is in various use environments, such as in a free space, in a holding position, and in a pocket or bag, etc., it is wasteful for the mobile phone if the same processing mode is used.

SUMMARY OF THE INVENTION

The present invention is proposed in view of the above problems and demands in the prior art. The present invention is addressed to provide a method for detecting the use environment of electronic apparatus by a vibrator and an accelerometer of the electronic apparatus, a method for optimizing the performance of the electronic apparatus according to the use environment of the electronic apparatus, and electronic apparatus using these methods.

According to a first aspect of the present invention, there is provided a method for detecting the use environment of electronic apparatus, the method comprising:

determining the basic parameters of the electronic apparatus;

searching for the acceleration thresholds of the electronic apparatus according to the determined basic parameters of the electronic apparatus; and determining the use environment of the electronic apparatus according to the detected acceleration of the electronic apparatus and the found acceleration thresholds of the electronic apparatus.

According to a second aspect of the present invention, there is provided a method as described according to the first aspect, wherein the basic parameters of electronic apparatus comprise: the weight of the electronic apparatus, the type and driving of the vibrator of the electronic apparatus, and the position of the vibrator of the electronic apparatus with respect to the accelerometer.

According to a third aspect of the present invention, there is provided a method as described according to the first aspect, wherein before determining the basic parameters of the electronic apparatus, the method further comprises:

determining and storing acceleration thresholds under various detecting conditions.

According to a fourth aspect of the present invention, there is provided a method as described according to the third aspect, wherein for each of the detecting conditions, the acceleration threshold under such a detecting condition is determined and stored, comprising:

determining the detecting condition;

detecting the accelerations of the electronic apparatus under the determined detecting condition and in various use environments; and storing the accelerations of the electronic apparatus under the determined detecting condition and in various use environments as the acceleration thresholds of the electronic apparatus under the detecting condition.

According to a fifth aspect of the present invention, there is provided a method as described according to the third or fourth aspect, wherein the detecting condition comprises: the weight of the electronic apparatus, the type and driving of the vibrator of the electronic apparatus, and the position of the vibrator of the electronic apparatus with respect to the accelerometer.

According to a sixth aspect of the present invention, there is provided a method as described according to the first aspect, wherein the acceleration thresholds of the electronic apparatus comprise: a maximum value, a middle value, and a minimum value;

the step of determining the use environment of the electronic apparatus according to the detected acceleration of the electronic apparatus and the found acceleration thresholds of the electronic apparatus comprises:

determining that the electronic apparatus is in a first use environment when the detected acceleration of the electronic apparatus is greater than the maximum value;

determining that the electronic apparatus is in a second use environment when the detected acceleration of the electronic apparatus is less than the maximum value and greater than the middle value;

determining that the electronic apparatus is in a third use environment when the detected acceleration of the electronic apparatus is less than the middle value and greater than the minimum value; and determining that the electronic apparatus is in a fourth use environment when the detected acceleration of the electronic apparatus is less than the minimum value.

According to a seventh aspect of the present invention, there is provided a method for optimizing the performance of electronic apparatus, the method comprising:

determining the use environment of the electronic apparatus; and processing a predetermined functional module corresponding to the use environment according to the detected use environment of the electronic apparatus;

wherein the detecting the use environment of the electronic apparatus comprises:

determining the basic parameters of the electronic apparatus;

searching for the acceleration thresholds of the electronic apparatus according to the determined basic parameters of the electronic apparatus; and determining the use environment of the electronic apparatus according to the detected acceleration of the electronic apparatus and the found acceleration thresholds of the electronic apparatus.

According to an eighth aspect of the present invention, there is provided a method as described according to the seventh aspect, wherein the basic parameters of the electronic apparatus comprise: the weight of the electronic apparatus, the type and driving of the vibrator of the electronic apparatus, and the position of the vibrator of the electronic apparatus with respect to the accelerometer.

According to a ninth aspect of the present invention, there is provided a method as described according to the seventh aspect, wherein before determining the basic parameters of the electronic apparatus, the method further comprises:

determining and storing acceleration thresholds under various detecting conditions.

According to a tenth aspect of the present invention, there is provided a method as described according to the ninth aspect, wherein for each of the detecting conditions, the acceleration threshold under such a detecting condition is determined and stored, comprising:

determining the detecting condition;

determining the accelerations of the electronic apparatus under the determined detecting condition and in various use environments; and storing the accelerations of the electronic apparatus under the determined detecting condition and in various use environments as the acceleration thresholds of the electronic apparatus under the detecting condition.

According to an eleventh aspect of the present invention, there is provided a method as described according to the ninth or tenth aspect, wherein the detecting condition comprises: the weight of the electronic apparatus, the type and driving of the vibrator of the electronic apparatus, and the position of the vibrator of the electronic apparatus with respect to the accelerometer.

According to a twelfth aspect of the present invention, there is provided a method as described according to the seventh aspect, wherein the acceleration thresholds of the electronic apparatus comprise: a maximum value, a middle value, and a minimum value;

the step of determining the use environment of the electronic apparatus according to the detected acceleration of the electronic apparatus and the found acceleration thresholds of the electronic apparatus comprises:

determining that the electronic apparatus is in a first use environment when the detected acceleration of the electronic apparatus is greater than the maximum value;

determining that the electronic apparatus is in a second use environment when the detected acceleration of the electronic apparatus is less than the maximum value and greater than the middle value;

determining that the electronic apparatus is in a third use environment when the detected acceleration of the electronic apparatus is less than the middle value and greater than the minimum value; and determining that the electronic apparatus is in a fourth use environment when the detected acceleration of the electronic apparatus is less than the minimum value.

According to a thirteenth aspect of the present invention, there is provided a method as described according to the seventh aspect, wherein the step of processing a predetermined functional module corresponding to the use environment according to the detected use environment of the electronic apparatus comprises:

configuring the antenna of the electronic apparatus to be matched with the use environment; and/or enabling the power-saving mode of the electronic apparatus; and/or lowering the vibrating speed of the vibrator of the electronic apparatus; and/or turning off the predetermined functional module of the electronic apparatus; and/or disabling the background lights of a liquid crystal screen, a key, or the predetermined functional module of the electronic apparatus; and/or muting the music and the vibration of the electronic apparatus; and/or lowering the volume of the music and the vibrating speed of the electronic apparatus.

According to a fourteenth aspect of the present invention, there is provided electronic apparatus, the electronic apparatus comprising: a vibrator for producing vibration according to the driving signal of the electronic apparatus; and an accelerometer for detecting the acceleration of the electronic apparatus;

wherein the electronic apparatus further comprises:

an environment detecting portion configured to detect the use environment of the electronic apparatus; and a processing portion configured to process a predetermined functional module corresponding to the use environment according to the use environment of the electronic apparatus detected by the environment detecting portion;

wherein the environment detecting portion comprises:

a first determining portion configured to determine the basic parameters of the electronic apparatus;

a searching portion or finding portion configured to search for the acceleration thresholds of the electronic apparatus according to the basic parameters of the electronic apparatus determined by the first determining portion; and a second determining portion configured to determine the use environment of the electronic apparatus according to the acceleration of the electronic apparatus detected by the accelerometer and the acceleration threshold of the electronic apparatus found by the searching portion;

wherein the basic parameters of electronic apparatus comprise: the weight of the electronic apparatus, the type and driving of the vibrator of the electronic apparatus, and the position of the vibrator of the electronic apparatus with respect to the accelerometer.

According to a fifteenth aspect of the present invention, there is provided electronic apparatus as described according to the fourteenth aspect, wherein the accelerometer is configured to detect the acceleration thresholds of the electronic apparatus under various detecting conditions;

the electronic apparatus further comprises:

a storing portion configured to store the acceleration thresholds of the electronic apparatus under various detecting conditions detected by the accelerometer;

wherein the detecting conditions comprise: the weight of the electronic apparatus, the type and driving of the vibrator of the electronic apparatus, and the position of the vibrator of the electronic apparatus with respect to the accelerometer.

According to a sixteenth aspect of the present invention, there is provided electronic apparatus as described according to the fifteenth aspect, wherein as for each of the detecting conditions, the accelerometer detects the accelerations of the electronic apparatus under the determined detecting condition and in various use environments; and the storing portion is configured to store different accelerations of the electronic apparatus under the determined detecting condition and in various use environments as the acceleration thresholds of the electronic apparatus under the detecting condition.

According to a seventeenth aspect of the present invention, there is provided electronic apparatus as described according to the fourteenth aspect, wherein the acceleration thresholds of the electronic apparatus found by the finding portion comprise: a maximum value, a middle value, and a minimum value;

the second determining portion is configured to:

determine that the electronic apparatus is in a first use environment when the detected acceleration of the electronic apparatus is greater than the maximum value;

determine that the electronic apparatus is in a second use environment when the detected acceleration of the electronic apparatus is less than the maximum value and greater than the middle value;

determine that the electronic apparatus is in a third use environment when the detected acceleration of the electronic apparatus is less than the middle value and greater than the minimum value; and determine that the electronic apparatus is in a fourth use environment when the detected acceleration of the electronic apparatus is less than the minimum value.

According to an eighteenth aspect of the present invention, there is provided electronic apparatus as described according to the fourteenth aspect, wherein the processing portion comprises any combination of the following modules:

a first processing module configured to configure the antenna of the electronic apparatus to be matched with the use environment;

a second processing module configured to enable the power-saving mode of the electronic apparatus;

a third processing module configured to lower the vibrating speed of the vibrator of the electronic apparatus;

a fourth processing module configured to turn off the predetermined functional module of the electronic apparatus;

a fifth processing module configured to disable the background lights of a liquid crystal screen, a key, or the predetermined functional module of the electronic apparatus;

a sixth processing module configured to mute the music and the vibration of the electronic apparatus; and a seventh processing module configured to lower the volume of the music and the vibrating speed of the electronic apparatus.

According to the method for detecting the use environment of electronic apparatus, the method for optimizing the performance of the electronic apparatus, and the electronic apparatus of the present invention, the detection of the use environment of electronic apparatus may be achieved by a vibrator and an accelerometer of the electronic apparatus, thereby optimizing the performance of the electronic apparatus according to the use environment of the electronic apparatus.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DESCRIPTION OF THE ACCOMPANYING DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings. In the drawings.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", comprises all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

The preferred embodiments of the present invention are described as follows in reference to the drawings.

When the use environments of a mobile phone are different, such as in a free space, in a holding position, and highly pressing in a pocket or bag, etc., although the driving signals of the vibrator acting on the mobile phone are the same, i.e. the vibrating speeds of the mobile phone are the same, the accelerating speeds of the mobile phone detected by the accelerometer of the mobile phone are different. In the present invention, the use environment of the mobile phone is detected by the vibrator and accelerometer of the mobile phone, and the performance of the mobile phone is optimized according to the detected use environment of the mobile phone.

Figure 1:
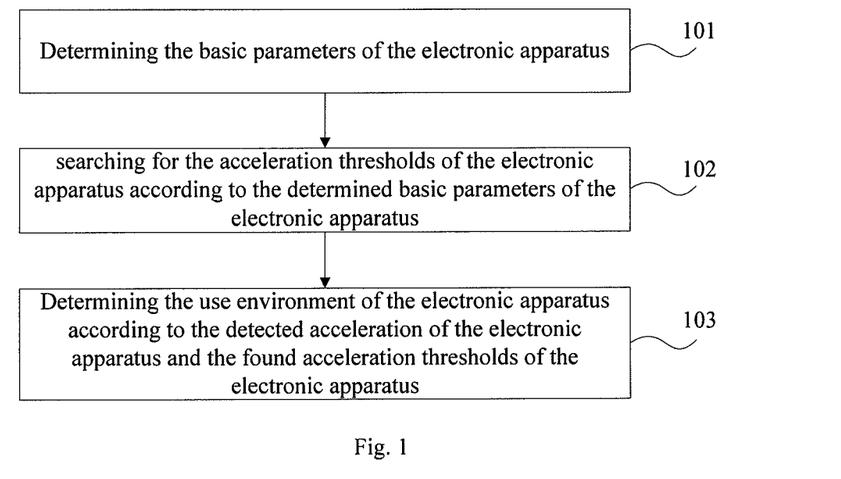
FIG. 1 illustrates a flowchart of a method for detecting the use environment of electronic apparatus of a first embodiment of the present invention.

FIG. 1 illustrates a flowchart of the method for detecting the use environment of electronic apparatus of a first embodiment of the present invention. Referring to FIG. 1, the method comprises:

step 101: determining the basic parameters of the electronic apparatus;

step 102: Searching for the acceleration threshold of the electronic apparatus according to the determined basic parameters of the electronic apparatus; and step 103: determining the use environment of the electronic apparatus according to the detected acceleration of the electronic apparatus and the found acceleration threshold of the electronic apparatus.

In this embodiment, the basic parameters of electronic apparatus to be determined comprise: the weight of the electronic apparatus, the type and driving of the vibrator of the electronic apparatus, and the position of the vibrator of the electronic apparatus with respect to the accelerometer.

In this embodiment, the electronic apparatus stores the acceleration threshold, the acceleration threshold being obtained by the accelerometer of the electronic apparatus under various detecting conditions, with each of the detecting conditions corresponding to a group of acceleration thresholds. The detecting conditions comprise: the weight of the electronic apparatus, the type and driving of the vibrator of the electronic apparatus, and the position of the vibrator of the electronic apparatus with respect to the accelerometer. A group of corresponding acceleration thresholds may be found according to the above basic parameters of the electronic apparatus.

Detecting and storing the acceleration thresholds under various detecting conditions will be described in detail as follows.

In this embodiment, the acceleration of the electronic apparatus is related to the weight of the electronic apparatus, the type and driving of the vibrator, the position of the vibrator with respect to the accelerometer, and the environment force of the electronic apparatus, and the weight of the electronic apparatus, the position of the vibrator with respect to the accelerometer and the type of the vibrator are fixed and known. Hence, under the above known conditions, if the same testing signal is used to drive the vibrator, different accelerations may be obtained through detection by the accelerometer under different use environments. In this embodiment, such different accelerations may be stored as a group of acceleration thresholds of the detecting condition. Thus, corresponding to each of the detecting conditions, a group of acceleration thresholds may be obtained through detection by the accelerometer.

Figure 2:
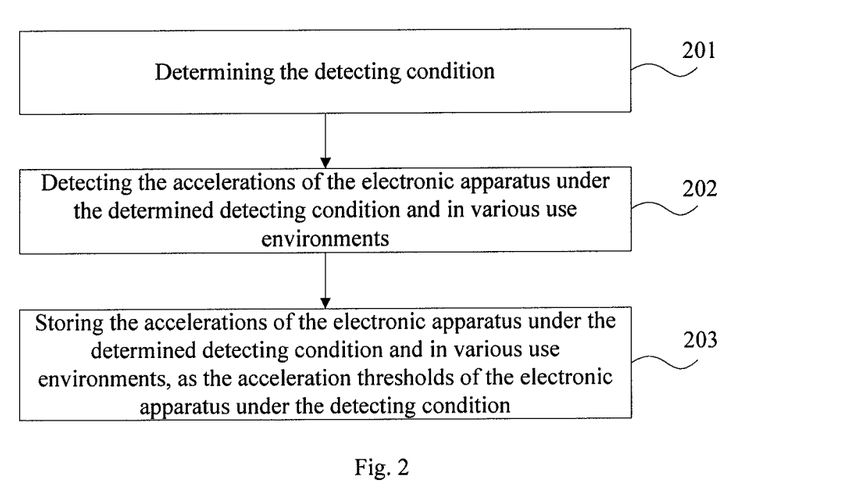
FIG. 2 illustrates a flowchart of detecting and storing an acceleration threshold under a certain detecting condition of the present invention.

FIG. 2 illustrates a flowchart of detecting and storing an acceleration threshold under a certain detecting condition. Referring to FIG. 2, the method comprises:

step 201: determining the detecting condition;

step 202: determining the accelerations of the electronic apparatus under the determined detecting condition and in various use environments; and step 203: storing these different accelerations of the electronic apparatus under the determined detecting condition and in various use environments, as the acceleration thresholds of the electronic apparatus under the detecting condition.

In this embodiment, in order to obtain an acceleration threshold, the detecting condition should be determined first, such as determining the weight of the electronic apparatus, the type of the vibrator of the electronic apparatus, the driving of the vibrator, and the position of the vibrator of the electronic apparatus with respect to the accelerometer of the electronic apparatus. If this detecting condition is determined, the detected acceleration may be corresponded to the detecting condition.

In this embodiment, if a detecting condition is determined, the accelerations of the electronic apparatus in various use environments may be detected by using the accelerometer of the electronic apparatus, and the accelerations in various use environments may be stored as the acceleration thresholds.

In this embodiment, the number of the acceleration thresholds of the mobile phone is dependent on the detected use environment of the electronic apparatus. For example, if the accelerations of the electronic apparatus under three kinds of use environments are detected, the acceleration thresholds comprise three values, and so on and so forth.

In an embodiment, if the accelerations of the electronic apparatus in three kinds of use environments are detected, the obtained acceleration thresholds contain three values, which may be a maximum value, a middle value and a minimum value. In other embodiments, if the accelerations of the electronic apparatus in two, four or more kinds of use environments are detected, the obtained acceleration thresholds contain two, four or more values. Details may be determined according to the precision of the detection, which shall not be described any further.

In this embodiment, after the acceleration thresholds under various detecting conditions are obtained by using the method as illustrated in FIG. 2, the acceleration thresholds may be stored in the electronic apparatus for searching later.

In this embodiment, the use environment of the electronic apparatus may be determined according to the detected acceleration of the electronic apparatus and the found acceleration thresholds of the electronic apparatus.

In an embodiment, the found acceleration thresholds of the electronic apparatus contain a maximum value, a middle value and a minimum value. According to the method of the present invention, it is determined that the electronic apparatus is in a first use environment when the detected acceleration of the electronic apparatus is greater than the maximum value; it is determined that the electronic apparatus is in a second use environment when the detected acceleration of the electronic apparatus is less than the maximum value and greater than the middle value; it is determined that the electronic apparatus is in a third use environment when the detected acceleration of the electronic apparatus is less than the middle value and greater than the minimum value; and it is determined that the electronic apparatus is in a fourth use environment when the detected acceleration of the electronic apparatus is less than the minimum value.

What is described above is illustrative only, and embodiments of determining the use environments of the electronic apparatus when the acceleration thresholds contain two, four or more values may be known to those skilled in the art according to the disclosure contained in the present invention, which shall not be described any further.

In accordance with a method of the present invention, the acceleration value of the electronic apparatus in various environments under various detecting condition is taken as the acceleration thresholds, according to the determinants of the acceleration of the electronic apparatus, then, the environment where the electronic apparatus is present is determined, according to the actually detected accelerations of the electronic apparatus, providing the basis for the enhancing of the electronic apparatus.

For better understanding of the method of the present invention, the method of the present invention will be described as follows, taking a mobile phone as the electronic apparatus, by way of example, with the use environments of the mobile phone comprising a free space, a holding position, and highly pressing.

Figure 3:
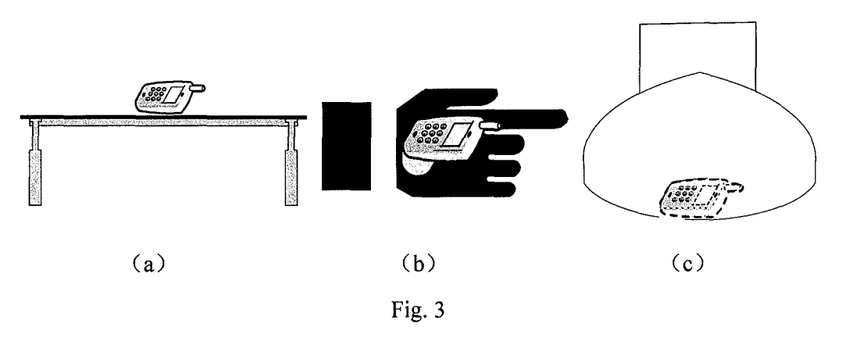
FIGS. 3(a)-3(c) illustrate three kinds of use environments of the electronic apparatus.
Figure 4:
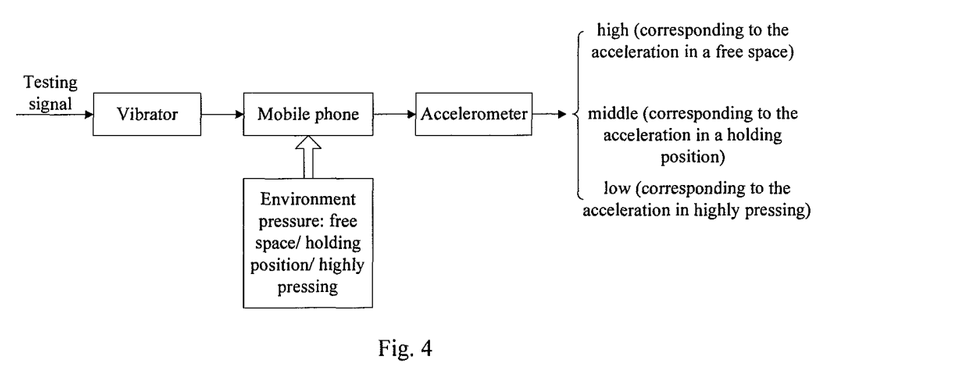
FIG. 4 illustrates a schematic diagram of detecting and storing an acceleration threshold by an accelerometer of the present invention.

FIGS. 3(a)-3(c) illustrate three kinds of use environments of the mobile phone. And FIG. 4 illustrates a process of detecting and storing the acceleration thresholds in three kinds of use environments. In the detecting process shown in FIG. 4, the detecting conditions are determined, i.e. the weight of the mobile phone, the type of the vibrator of the mobile phone, and the position of the vibrator of the mobile phone with respect to its accelerometer are determined.

Reference is now made to FIG. 4.

First, identical testing signals are used to drive the vibrator of the mobile phone. Here, the testing signals may be fixed voltages, fixed frequencies, or fixed duty cycles.

Then, the mobile phone is placed in a free space, as shown in FIG. 3(a), and the acceleration of the mobile phone in the free space is detected by the accelerometer of the mobile phone, which is stored as the maximum value (high) in the acceleration thresholds.

Then, the mobile phone is placed in a holding position, as shown being held in a hand in FIG. 3(b), and the acceleration of the mobile phone in the holding position is detected by the accelerometer of the mobile phone, which is stored as the middle value (middle) in the acceleration thresholds.

And finally, the mobile phone is placed in a highly pressing environment, such as in a pocket or bag shown in FIG. 3(c), and the acceleration of the mobile phone in the highly pressing environment is detected by the accelerometer of the mobile phone, which is stored as the minimum value (low) in the acceleration thresholds.

A group of acceleration thresholds of the mobile phone in a free space, in a holding position and in a highly pressing environment are obtained through above detecting process. Such a group of acceleration thresholds correspond to the current detecting condition, i.e. the weight of the present mobile phone, type and driving of the vibrator, and the position of the vibrator with respect to the accelerometer.

What is described above is just an example of a mobile phone, of which the accelerations are detected in various use environments, with the accelerations being stored as acceleration thresholds. In practice, the accelerations of the mobile phone under multiple detecting conditions may be detected, with the accelerations being stored as acceleration thresholds, which shall not be described any further. Thus, multiple acceleration thresholds under multiple detecting conditions are stored.

In daily use of the mobile phone, the use state of the mobile phone may be determined by using the method provided in the present invention according to the detected acceleration of the mobile phone and the acceleration thresholds stored in the mobile phone.

In this embodiment, assuming that the corresponding acceleration thresholds of the mobile phone are determined as a maximum value (high), a middle value (middle) and a minimum value (low), respectively, according to the basic parameters of the mobile phone, such as the weight of the mobile phone, the type and driving of the vibrator of the mobile phone and the position of the vibrator of the mobile phone with respect to its accelerometer, and that the detected acceleration of the mobile phone is A_peed_Measured, it is determined that the mobile phone is in a free space when A_peed_Measured>high;

it is determined that the mobile phone is in a pocket, strapped in the air when middle<A_peed_Measured<high;

it is determined that the mobile phone is in a holding position when low<A_peed Measured<middle; and it is determined that the mobile phone is in a highly pressing environment, such as in a hand-held position or in a fixed device, when A_peed_Measured<low.

In accordance with the method of the present invention, the acceleration thresholds of the mobile phone are detected using the vibrator and the accelerometer and are stored, and then the use environment of the mobile phone is determined according to the actually detected acceleration of the mobile phone, thereby providing the basis for the enhancement of the mobile phone.

According to another aspect of the present invention, there is also provided a method for optimizing the performance of the electronic apparatus, wherein after the use environment of the electronic apparatus is detected, the performance of the electronic apparatus is correspondingly optimized on the basis of the aforementioned embodiments according to the use environment.

Figure 5:
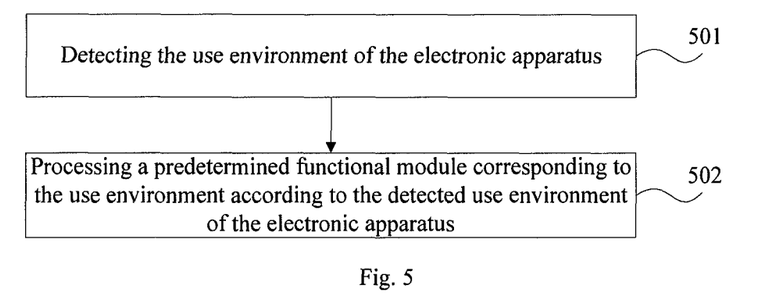
FIG. 5 illustrates a flowchart of a method for optimizing the performance of electronic apparatus of a second embodiment of the present invention.

FIG. 5 illustrates a flowchart of the method for optimizing the performance of electronic apparatus of a second embodiment of the present invention. Referring to FIG. 5, the method comprises:

step 501: detecting the use environment of the electronic apparatus;

wherein the detecting the use environment of the electronic apparatus is the same as that in the method of the embodiment described in connection with FIG. 1, and what is described in conjunction with FIGS. 1, 2 and 3(a)-3(c) are incorporated herein as a part of this embodiment, which shall not be described any further; and step 502: processing a predetermined functional module corresponding to the use environment according to the detected use environment of the electronic apparatus;

wherein the processing comprises but is not limited to: configuring the antenna of the electronic apparatus to be matched with the use environment; enabling the power-saving mode of the electronic apparatus; lowering the vibrating speed of the vibrator of the electronic apparatus; turning off the predetermined functional module of the electronic apparatus; disabling the background lights of a liquid crystal screen, a key (keys), or the predetermined functional module; muting the music and the vibration; and/or lowering the volume of the music and the vibrating speed.

In this embodiment, the predetermined functional module corresponding to the use environment may be processed according to the detected use environment of the electronic apparatus.

For example, when it is detected that the electronic apparatus is in a free space, the antenna of the electronic apparatus may be configured to be matched with the free space. Since there is no user around the free space, the power-saving mode of the electronic apparatus may also be enabled. The vibrating speed of the vibrator of the electronic apparatus may also be lowered. Some functional modules of the electronic apparatus may also be powered off for power saving, until the electronic apparatus is touched. Of course, the detection of the electronic apparatus being touched may also be determined by the method provided in the present invention.

For another example, when it is detected that the electronic apparatus is in such highly pressing environment as in a bag or in a pocket, it means that the electronic apparatus is not viewed. At this time, the background lights of a liquid crystal screen, a key (keys), or other functional modules of the electronic apparatus may be disabled, until the electronic apparatus is taken up. Of course, the detection of the electronic apparatus being taken up may also be determined by the method provided in the present invention.

For further example, when it is detected that the electronic apparatus is in a holding position or in a highly pressing environment, it shows that there may be an incoming call. At this time, the music and the vibration may be muted, or the volume of the music and the vibrating speed may be lowered.

In accordance with the method of the present invention, the predetermined functional module corresponding to the use environment is processed according to the detected use environment of the electronic apparatus, the performance of the electronic apparatus is optimized, and the application of the electronic apparatus is enhanced.

According to a further aspect of the present invention, there is also provided electronic apparatus, which adopts the methods as described in the above embodiments, and of which the use environment may be detected, and the performance may be further optimized according to the use environment.

Figure 6:
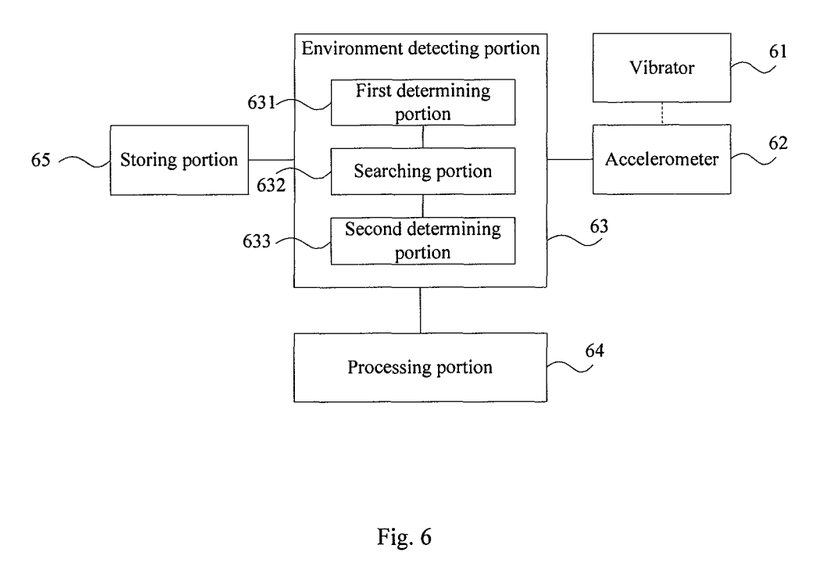
FIG. 6 illustrates the composition of the electronic apparatus of a third embodiment of the present invention.

FIG. 6 illustrates the composition of the electronic apparatus of a third embodiment of the present invention. Referring to FIG. 6, the electronic apparatus comprises: a vibrator 61, an accelerometer 62, an environment detecting portion 63 and a processing portion 64, wherein the vibrator 61 is configured to produce vibration according to the driving signal of the electronic apparatus;

the accelerometer 62 is configured to detect the acceleration of the electronic apparatus;

the vibrator 61 and the accelerometer 62 may be implemented by the original vibrator and accelerometer of the electronic apparatus, and the detailed operational process of which is the same as that of the prior, which shall not be described any further;

the environment detecting portion 63 is configured to detect the use environment of the electronic apparatus.

In an embodiment, the environment detecting portion 63 comprises: a first determining portion 631, a searching portion 632 and a second determining portion 633, wherein the first determining portion 631 is configured to determine the basic parameters of the electronic apparatus, the basic parameters of electronic apparatus comprising the weight of the electronic apparatus, the type and driving of the vibrator 61 of the electronic apparatus, and the position of the vibrator 61 of the electronic apparatus with respect to the accelerometer 62;

the searching portion 632 is configured to search for the acceleration threshold of the electronic apparatus according to the basic parameters of the electronic apparatus determined by the first determining portion 631; and the second determining portion 633 is configured to determine the use environment of the electronic apparatus according to the acceleration of the electronic apparatus detected by the accelerometer 62 and the acceleration threshold of the electronic apparatus found by the searching portion 632.

In this embodiment, the accelerometer 62 is further configured to detect the acceleration thresholds of the electronic apparatus under various detecting conditions; wherein the detecting conditions comprise: the weight of the electronic apparatus, the type and driving of the vibrator of the electronic apparatus, and the position of the vibrator of the electronic apparatus with respect to the accelerometer.

In this embodiment, the accelerometer 62 is configured to, for each of the detecting conditions, detect the accelerations of the electronic apparatus under the determined detecting condition and in various use environments. A storing portion 65 is configured to store various accelerations of the electronic apparatus under the determined detecting condition and in various use environments, as the acceleration threshold of the electronic apparatus under the detecting condition.

In this embodiment, the electronic apparatus further comprises:

a storing portion 65 configured to store the acceleration threshold of the electronic apparatus under various detecting conditions, for searching by the searching portion 632.

In this embodiment, the vibrator, together with the accelerometer 62, detect and obtain the acceleration threshold in advance and store the acceleration threshold in the storing portion 65 of the electronic apparatus. When it is found by the searching portion 632 from the storing portion 65 according to the basic parameters of the electronic apparatus that the acceleration threshold corresponding to the electronic apparatus comprises a maximum value, a middle value, and a minimum value, the second determining portion 633 is configured to determine the use environment of the electronic apparatus in four manners as follows:

1. determining that the electronic apparatus is in a first use environment when the acceleration of the electronic apparatus detected by the accelerometer 62 is greater than the maximum value;

2. determining that the electronic apparatus is in a second use environment when the acceleration of the electronic apparatus detected by the accelerometer 62 is less than the maximum value and greater than the middle value;

3. determining that the electronic apparatus is in a third use environment when the acceleration of the electronic apparatus detected by the accelerometer 62 is less than the middle value and greater than the minimum value; and 4. determining that the electronic apparatus is in a fourth use environment when the acceleration of the electronic apparatus detected by the accelerometer 62 is less than the minimum value.

The use environment of the electronic apparatus may be determined through detection by the above components of the electronic apparatus. The processing portion 64 may process the predetermined functional modules corresponding to the use environment according to the use environment.

In this embodiment, the processing portion 64 comprises any combination of the following modules:

a first processing module configured to configure the antenna of the electronic apparatus to be matched with the use environment; a second processing module configured to enable the power-saving mode of the electronic apparatus;

a third processing module configured to lower the vibrating speed of the vibrator of the electronic apparatus;

a fourth processing module configured to turn off the predetermined functional module of the electronic apparatus;

a fifth processing module configured to disable the background lights of a liquid crystal screen, a key, or the predetermined functional module;

a sixth processing module configured to mute the music and the vibration of the electronic apparatus; and a seventh processing module configured to lower the volume of the music and the vibrating speed of the electronic apparatus.

The above processing modules and their functions are examples only, and this embodiment is not limited to these modules. In practice, other processing modules may also be included according to the power-saving demand of the electronic apparatus or according to the application requirement of the electronic apparatus in various use environments. Various changes readily occurring to those skilled in the art fall within the scope of the present invention.

In practice, the processing portion 64 may enable any combination of the above modules to fulfill their functions according to the determined use environment of the electronic apparatus.

For example, when the environment detecting portion 63 detects that the use environment of the electronic apparatus is in a free space, the processing portion 64 may enable the first processing module to configure the antenna of the electronic apparatus to be matched with the use environment. And at the same time, the processing portion 64 may also enable the second processing module to enable the power-saving mode of the electronic apparatus. Meanwhile, the processing portion 64 may also enable the third processing module to lower the vibrating speed of the vibrator of the electronic apparatus. And at the same time, the processing portion 64 may also enable the fourth processing module to close the predetermined functional module of the electronic apparatus.

For example, when the environment detecting portion 63 detects that the use environment of the electronic apparatus is in such highly pressing environment as in a pocket, the processing portion 64 may enable the fifth processing module to disable the background lights of a liquid crystal screen, a key, or the predetermined functional module.

For example, when the environment detecting portion 63 detects that the use environment of the electronic apparatus is in a holding position, the processing portion 64 may enable the sixth processing module to mute the music and the vibration of the electronic apparatus.

For example, when the environment detecting portion 63 detects that the use environment of the electronic apparatus is such highly pressing environment as in hand, the processing portion 64 may enable the seventh processing module to lower the volume of the music and the vibrating speed of the electronic apparatus.

The electronic apparatus of this embodiment may be a mobile phone

The components of the electronic apparatus of this embodiment are respectively used to carry out the steps of the aforementioned embodiments of the method. Since these steps are described in detail in the aforementioned embodiments of the method, they shall not be described any further. Each of the steps and its particular explanation described in the method are incorporated herein for interpreting the electronic apparatus of this embodiment.

Using the electronic apparatus of the present invention, the acceleration thresholds may be stored in advance according to the detection under the detecting condition detected by the vibrator in cooperation with the accelerometer, and the use environment of the electronic apparatus is determined according to the actual acceleration of the electronic apparatus detected by the accelerometer, further optimizing the performance of the electronic apparatus.

The environment detecting technology of the present invention will be further described in the following in connection with the application in a mobile phone and a wireless network, or in a computer and such network as Internet.

Figure 7:
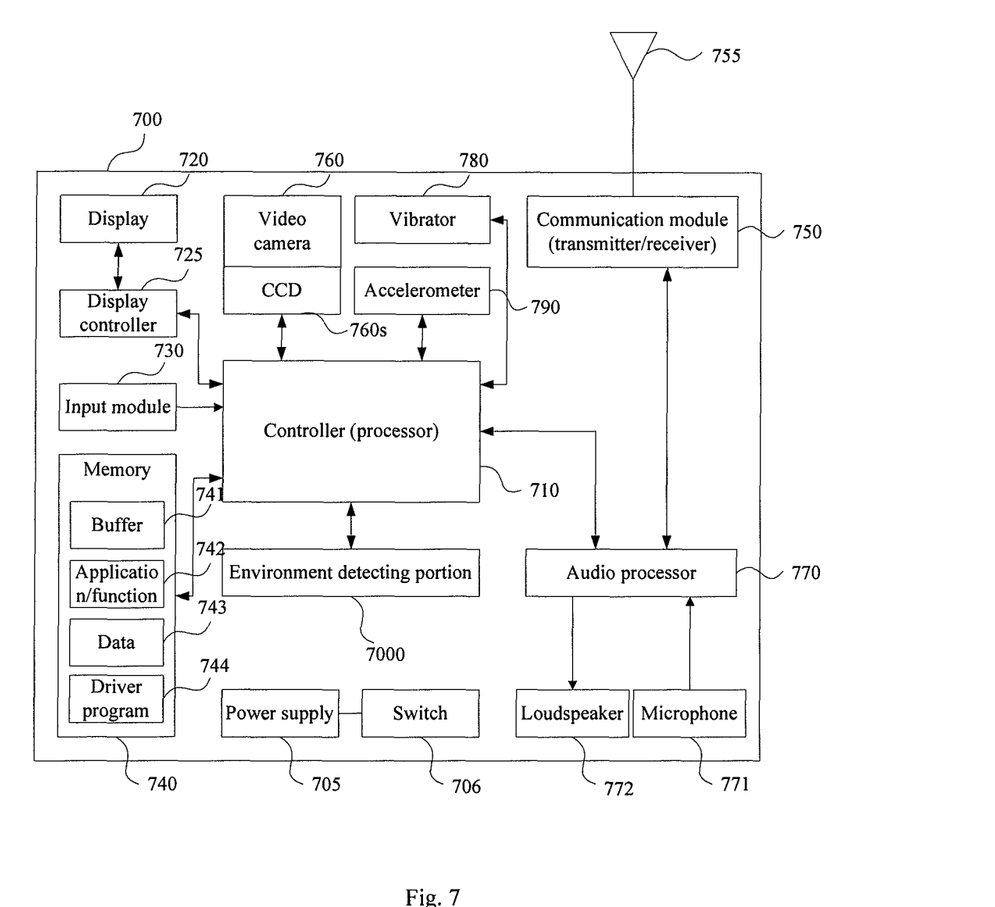
FIG. 7 illustrates the composition of the mobile phone of a fourth embodiment of the present invention.

FIG. 7 illustrates the composition of an operational circuit 700 of the mobile phone of the fourth embodiment of the present invention, in which the environment detecting portion 7000 according to the third embodiment of the present invention is included. This figure is exemplary and other types of circuits may also be used for supplementing or replacing this operational circuit to achieve telecommunications functions or other functions. The operational circuit 700 comprises a controller 710 (also referred to as a processor or an operational control component, which may comprise a microprocessor or other processor devices and/or logic devices), which receives input and controls each of the components and operations of the operational circuit 700. In the present invention, the controller 710 can perform the function of the processing portion 64 of the electronic apparatus of the embodiment shown in FIG. 6 and process the predetermined functional module corresponding to the use environment according to the use environment of the electronic apparatus detected by the environment detecting portion 7000. An input module 730 provides input to the controller 710. The input module 730 may be, for example, a key or touch input device. A video camera 760 may comprise a lens, a shutter and an image sensor 760s (for example, a digital image sensor of a CCD (charge-coupled device), a CMOS device, or other image sensors). The images detected by the image sensor 760s may be provided to the controller 710 for use in a conventional manner, such as storing, and transmitting, etc.

A display controller 725 responds to the input from a touch screen display 720 or other types of displays 720 capable of providing input to the display controller 725. In this way, for example, the touch of a touch pen or a finger to a part of the touch screen display 720, such as selection of a picture from a displayed picture table or selection of an icon or a function from a graphical user interface (GUI) displayed on the touch screen display 720, can provide input to the controller 710 in a conventional manner. The display controller 725 may also receive input from the controller 710 to display a picture, an icon, and information, etc on the touch screen display 720. The input module 730 may be, for example, the key itself, and/or a signal conditioning circuit, a decoding circuit, or another appropriate circuit for providing the controller 710 with information indicative of operating one or more keys in a conventional manner.

A memory 740 is coupled to the controller 710. The memory 740 may be a solid-state memory, such as an ROM, a RAM, or a SIM card. It may also such a memory that it saves information, can be selectively erased and is provided with more data, even if it is powered off. An example of such a memory is sometimes referred to as an EPROM. The memory 740 may also be a device of another type. The memory 740 comprises a buffer memory 741 (sometimes referred to as a buffer). The memory 740 may comprise an application/function storing portion 742 for storing application programs and function programs or for executing the routines of the operation of the mobile phone via the controller 710. The memory 740 may comprise a data storing portion 743 for storing data, such as a contact person, digital data, a picture, a sound and/or other data used by the mobile phone. In this embodiment, the memory 740 may used for realizing the function of the storing portion 65 of the embodiment shown in FIG. 6 and for storing the acceleration thresholds of the mobile phone under various detecting conditions and in various use environments detected by the accelerometer 62. A driver program storing portion 744 of the memory 740 may comprise various driver programs of the mobile phone for communication functions and/or for executing other functions (such as application of message transmission, and application of directory, etc.) of the mobile phone.

The mobile phone comprises a telecommunications portion. The telecommunications portion comprises, for example, a communication module 750, i.e. a transmitter/receiver 750 transmitting outbound signals and receiving inbound signals via an antenna 755. The communication module (transmitter/receiver) 750 is coupled to the controller 710 to provide input signals and receive output signals, such a case being the same as that for a conventional mobile phone. The communication module (transmitter/receiver) 750 is also coupled to a loudspeaker 772 and a microphone 771 via an audio processor 770 to provide audio output via the loudspeaker 772 and receive audio input from the microphone 771, thereby realizing the usually telecommunications functions. The loudspeaker 772 and the microphone 771 enable a user to listen and speak via the mobile phone. The audio processor 770 may comprise any appropriate buffer, decoder, and amplifier, etc. Furthermore, the audio processor 770 is also coupled to the controller 710, thereby enabling the microphone 771 to record on the mobile phone itself, and enabling the sound stored in the mobile phone itself to be played via the loudspeaker 772.

The mobile phone comprises a vibrator 780 and an accelerometer 790. The vibrator 780 generates vibration according to a driver signal. Here, the driver signal may be a driver signal generated according to an incoming call, or a driving signal generated when the internal timer of the mobile phone expires. The accelerometer 790 detects the acceleration of the mobile phone according to the vibration of the vibrator 780 or other factors. In this embodiment, the vibrator 780 and accelerometer 790 are also configured to realize the functions of the vibrator 61 and accelerometer 62 of the electronic apparatus shown in FIG. 6, which shall not be described any further.

The mobile phone further comprises a power supply 705 which may be coupled to supply power to the operational circuit 700 after an on/off switch 706 is turned on.

For the telecommunications functions and/or other various applications and/or functions that can be selected from the GUI, the mobile phone may be operated in a conventional manner. For example, the mobile phone can initiate and receive a telephone call, play songs, pictures, videos, and movies, etc., take and store photos or videos, make, store, maintain and display files and database (such as contact persons or other database), browse Internet, and remind calendar, etc.

The environment detecting portion 7000 included in the mobile phone is substantially the same with respect to structure as the environment detecting portion 63 described above with reference to FIG. 6, which shall not be described any further. It should be noted that in general, a specific part realizing the environment detecting portion 7000 is not needed to be provided in the mobile phone; instead, the environment detecting portion 7000 is realized in the mobile phone by existing hardware (such as the controller 710, the communication module 750, the audio processor 770, the memory 740, the input module 730, and the display 720, etc.) in combination with the application program that realizes the functions of the environment detecting portion of the present invention. However, the implementation is not excluded in the present invention that the environment detecting portion 7000 is realized as a specific chip or hardware.

According to one embodiment of the present invention, in the case where a vibrator 780 and an accelerometer 790 are built in the mobile phone, according to the cooperation of the vibrator 780 and accelerometer 790, the accelerations of the mobile phone corresponding to various detecting conditions and various use environments are stored in the memory 740 of the mobile phone as acceleration thresholds. When the mobile phone is in use, the acceleration of the mobile phone is detected by the accelerometer 790, and the acceleration threshold corresponding to the mobile phone is searched in the memory 740 by the environment detecting portion 7000 of the mobile phone; after the acceleration threshold is found, the use environment of the mobile phone is determined according to the acceleration detected by the accelerometer 790, then, driving the controller 710 to carry out the corresponding optimization according to the use environment of the mobile phone.

In an embodiment, if the use environment of the mobile phone detected by the environment detecting portion 7000 is in a free space, it indicates that the mobile phone is not in use currently, and not much power consumption is needed. At this time, the environment detecting portion 7000 drives the controller 710 to configure the antenna 755 to be matched with such a free space and drives the controller 710 to turn off some of the predetermined functional modules to save power.

Although only preferred embodiments are selected to illustrate the present invention, various changes and modifications are readily made by those skilled in the art without departing from the scope of the present invention defined by the appended claims. The description of the above embodiments is illustrative only, and is not intended to limit the present invention that is defined by the appended claims and their equivalents.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof It should be understood that each of the parts of the present invention may be implemented by hardware, software, firmware, or a combination thereof In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A method for detecting the use environment of electronic apparatus, the method comprising:
   determining the basic parameters of the electronic apparatus;
   searching for the acceleration thresholds of the electronic apparatus according to the determined basic parameters of the electronic apparatus; and
   determining the use environment of the electronic apparatus according to the detected acceleration of the electronic apparatus and the found acceleration thresholds of the electronic apparatus.

2. The method according to claim 1, wherein the basic parameters of electronic apparatus comprise: the weight of the electronic apparatus, the type and driving of the vibrator of the electronic apparatus, and the position of the vibrator of the electronic apparatus with respect to the accelerometer.

3. The method according to claim 1, wherein before determining the basic parameters of the electronic apparatus, the method further comprises:
   determining and storing acceleration thresholds under various detecting conditions.

4. The method according to claim 3, wherein for each of the detecting conditions, the acceleration threshold under such a detecting condition is determined and stored, comprising:
   determining the detecting condition;
   detecting the accelerations of the electronic apparatus under the determined detecting condition and in various use environments; and
   storing the accelerations of the electronic apparatus under the determined detecting condition and in various use environments, as the acceleration thresholds of the electronic apparatus under the detecting condition.

5. The method according to claim 4, wherein the detecting condition comprises: the weight of the electronic apparatus, the type and driving of the vibrator of the electronic apparatus, and the position of the vibrator of the electronic apparatus with respect to the accelerometer.

6. The method according to claim 3, wherein the detecting condition comprises: the weight of the electronic apparatus, the type and driving of the vibrator of the electronic apparatus, and the position of the vibrator of the electronic apparatus with respect to the accelerometer.

7. The method according to claim 1, wherein the acceleration thresholds of the electronic apparatus comprise: a maximum value, a middle value, and a minimum value;
   the step of determining the use environment of the electronic apparatus according to the detected acceleration of the electronic apparatus and the found acceleration thresholds of the electronic apparatus comprises:
   determining that the electronic apparatus is in a first use environment when the detected acceleration of the electronic apparatus is greater than the maximum value;
   determining that the electronic apparatus is in a second use environment when the detected acceleration of the electronic apparatus is less than the maximum value and greater than the middle value;

determining that the electronic apparatus is in a third use environment when the detected acceleration of the electronic apparatus is less than the middle value and greater than the minimum value; and
determining that the electronic apparatus is in a fourth use environment when the detected acceleration of the electronic apparatus is less than the minimum value.

8. A method for optimizing the performance of electronic apparatus, the method comprising:
determining the use environment of the electronic apparatus; and
processing a predetermined functional module corresponding to the use environment according to the determined use environment of the electronic apparatus;
wherein the determining the use environment of the electronic apparatus comprises:
determining the basic parameters of the electronic apparatus;
searching for the acceleration thresholds of the electronic apparatus according to the determined basic parameters of the electronic apparatus; and
determining the use environment of the electronic apparatus according to the detected acceleration of the electronic apparatus and the found acceleration thresholds of the electronic apparatus.

9. The method according to claim 8, wherein the basic parameters of the electronic apparatus comprise: the weight of the electronic apparatus, the type and driving of the vibrator of the electronic apparatus, and the position of the vibrator of the electronic apparatus with respect to the accelerometer.

10. The method according to claim 8, wherein before determining the basic parameters of the electronic apparatus, the method further comprises:
determining and storing acceleration thresholds under various detecting conditions.

11. The method according to claim 10, wherein for each of the detecting conditions, the acceleration threshold under such a detecting condition is determined and stored, comprising:
determining the detecting condition;
determining the accelerations of the electronic apparatus under the determined detecting condition and in various use environments; and
storing the accelerations of the electronic apparatus under the determined detecting condition and in various use environments, as the acceleration thresholds of the electronic apparatus under the detecting condition.

12. The method according to claim 11, wherein the detecting condition comprises: the weight of the electronic apparatus, the type and driving of the vibrator of the electronic apparatus, and the position of the vibrator of the electronic apparatus with respect to the accelerometer.

13. The method according to claim 10, wherein the detecting condition comprises: the weight of the electronic apparatus, the type and driving of the vibrator of the electronic apparatus, and the position of the vibrator of the electronic apparatus with respect to the accelerometer.

14. The method according to claim 8, wherein the acceleration thresholds of the electronic apparatus comprise: a maximum value, a middle value, and a minimum value;
the step of determining the use environment of the electronic apparatus according to the detected acceleration of the electronic apparatus and the found acceleration thresholds of the electronic apparatus comprises:
determining that the electronic apparatus is in a first use environment when the detected acceleration of the electronic apparatus is greater than the maximum value;
determining that the electronic apparatus is in a second use environment when the detected acceleration of the electronic apparatus is less than the maximum value and greater than the middle value;
determining that the electronic apparatus is in a third use environment when the detected acceleration of the electronic apparatus is less than the middle value and greater than the minimum value; and
determining that the electronic apparatus is in a fourth use environment when the detected acceleration of the electronic apparatus is less than the minimum value.

15. The method according to claim 8, wherein the step of processing a predetermined functional module corresponding to the use environment according to the detected use environment of the electronic apparatus comprises:
configuring the antenna of the electronic apparatus to be matched with the use environment; and/or
enabling the power-saving mode of the electronic apparatus; and/or
lowering the vibrating speed of the vibrator of the electronic apparatus; and/or
turning off the predetermined functional module of the electronic apparatus; and/or
disabling the background lights of a liquid crystal screen, a key, or the predetermined functional module of the electronic apparatus; and/or
muting the music and the vibration of the electronic apparatus; and/or
lowering the volume of the music and the vibrating speed of the electronic apparatus.

16. Electronic apparatus, the electronic apparatus comprising: a vibrator for producing vibration according to the driving signal of the electronic apparatus; and an accelerometer for detecting the acceleration of the electronic apparatus;
wherein the electronic apparatus further comprises:
an environment detecting portion configured to detect the use environment of the electronic apparatus; and
a processing portion configured to process a predetermined functional module corresponding to the use environment according to the use environment of the electronic apparatus detected by the environment detecting portion;
wherein the environment detecting portion comprises:
a first determining portion configured to determine the basic parameters of the electronic apparatus;
a searching portion configured to search for the acceleration thresholds of the electronic apparatus according to the basic parameters of the electronic apparatus determined by the first determining portion; and
a second determining portion configured to determine the use environment of the electronic apparatus according to the acceleration of the electronic apparatus detected by the accelerometer and the acceleration threshold of the electronic apparatus found by the searching portion;
wherein the basic parameters of electronic apparatus comprise: the weight of the electronic apparatus, the type and driving of the vibrator of the electronic apparatus, and the position of the vibrator of the electronic apparatus with respect to the accelerometer.

17. Electronic apparatus according to claim 16, wherein the accelerometer is configured to detect the acceleration thresholds of the electronic apparatus under various detecting conditions;
the electronic apparatus further comprises:
a storing portion configured to store the acceleration thresholds of the electronic apparatus under various detecting conditions detected by the accelerometer;

wherein the detecting conditions comprise: the weight of the electronic apparatus, the type and driving of the vibrator of the electronic apparatus, and the position of the vibrator of the electronic apparatus with respect to the accelerometer.

18. Electronic apparatus according to claim 17, wherein as for each of the detecting conditions, the accelerometer detects the accelerations of the electronic apparatus under the determined detecting condition and in various use environments; and the storing portion is configured to store different accelerations of the electronic apparatus under the determined detecting condition and in various use environments as the acceleration thresholds of the electronic apparatus under the detecting condition.

19. Electronic apparatus according to claim 16, wherein the acceleration thresholds of the electronic apparatus found by the finding portion comprise: a maximum value, a middle value, and a minimum value;

the second determining portion is configured to:

determine that the electronic apparatus is in a first use environment when the detected acceleration of the electronic apparatus is greater than the maximum value;

determine that the electronic apparatus is in a second use environment when the detected acceleration of the electronic apparatus is less than the maximum value and greater than the middle value;

determine that the electronic apparatus is in a third use environment when the detected acceleration of the electronic apparatus is less than the middle value and greater than the minimum value; and determine that the electronic apparatus is in a fourth use environment when the detected acceleration of the electronic apparatus is less than the minimum value.

20. Electronic apparatus according to claim 16, wherein the processing portion comprises any combination of the following modules:

a first processing module configured to configure the antenna of the electronic apparatus to be matched with the use environment;

a second processing module configured to enable the power-saving mode of the electronic apparatus;

a third processing module configured to lower the vibrating speed of the vibrator of the electronic apparatus;

a fourth processing module configured to turn off the predetermined functional module of the electronic apparatus;

a fifth processing module configured to disable the background lights of a liquid crystal screen, a key, or the predetermined functional module of the electronic apparatus;

a sixth processing module configured to mute the music and the vibration of the electronic apparatus; and a seventh processing module configured to lower the volume of the music and the vibrating speed of the electronic apparatus.

* * * * *